US008902112B2

(12) United States Patent
Dutruc

(10) Patent No.: US 8,902,112 B2
(45) Date of Patent: Dec. 2, 2014

(54) AIRCRAFT ANTENNA, AND AN AIRCRAFT

(71) Applicant: Airbus Helicopters, Marignane, Cedex (FR)

(72) Inventor: Herve Dutruc, Ensues la Redonne (FR)

(73) Assignee: Airbus Helicopters, Marignane Cedex (FR)

( * ) Notice: Subject to any disclaimer, the term of this patent is extended or adjusted under 35 U.S.C. 154(b) by 192 days.

(21) Appl. No.: 13/648,617

(22) Filed: Oct. 10, 2012

(65) Prior Publication Data

US 2013/0093632 A1 Apr. 18, 2013

(30) Foreign Application Priority Data

Oct. 12, 2011 (FR) ..................................... 11 03102

(51) Int. Cl.
*H01Q 1/28* (2006.01)
*H01Q 1/44* (2006.01)
*B64C 27/00* (2006.01)

(52) U.S. Cl.
CPC . *H01Q 1/28* (2013.01); *H01Q 1/44* (2013.01); *B64C 27/006* (2013.01)
USPC ............................ 343/708; 343/705; 343/720

(58) Field of Classification Search
CPC .................................. H01Q 1/28; H01Q 1/44
USPC ......................................... 343/708, 705, 720
See application file for complete search history.

(56) References Cited

U.S. PATENT DOCUMENTS

| | | | |
|---|---|---|---|
| 4,215,833 A | | 8/1980 | Chan |
| 5,415,364 A | | 5/1995 | Grant |
| 5,952,976 A | * | 9/1999 | Giacino et al. ................ 343/705 |
| 7,721,993 B2 | | 5/2010 | Law |
| 2010/0064523 A1 | | 3/2010 | Claeys |

FOREIGN PATENT DOCUMENTS

| | | |
|---|---|---|
| EP | 2165930 A1 | 3/2010 |
| FR | 2443309 A1 | 7/1980 |
| FR | 9507214 A1 | 3/1995 |
| WO | 9938770 A2 | 8/1999 |
| WO | 2006068507 A1 | 6/2006 |

OTHER PUBLICATIONS

Wikipedia Article; http://en.wikipedia.org/wiki/Antenna_tuner; Page last modified Aug. 29, 2012 at 20:53.

Search Report and Written Opinion: Application No. FR 1103102; dated Jul. 17, 2012.

* cited by examiner

*Primary Examiner* — Hoang V Nguyen

(74) *Attorney, Agent, or Firm* — Brooks Kushman P.C.

(57) ABSTRACT

The present invention relates to an antenna (7) for an aircraft (1), the antenna being fitted with a coaxial cable provided with a coaxial connector (25) comprising a core (26) and shielding (27), the coaxial cable (24) being suitable for being connected to a source (40) for co-operating with the antenna (7). The antenna comprises a cable-cutter device (10) having a frame (12) carrying two sharp edges (11), said antenna (7) including an impedance-matching system (35) connecting said frame (12) to said core (26), said frame being a radiating member of the antenna.

10 Claims, 1 Drawing Sheet

1
2
7
12
10
35
8
2'
11
24
25
6
40
5
24
25
11
10
12
35
4
7
9
3

15
50

61
7
12
14
45
36
35
10
11
100
38
11
39
61
37
8"
13
60
46
8
8'
40
26
27
25
24

15
50
7
61
12
35
10
14
11

100
11
61
45
8"
13
60
46
8
8'
40
26
25
24
27

AIRCRAFT ANTENNA, AND AN AIRCRAFT

CROSS REFERENCE TO RELATED APPLICATIONS

This application claims priority to FR 11 03102 filed on Oct. 12, 2011, the disclosure of which is incorporated in its entirety by reference herein.

BACKGROUND OF THE INVENTION (1) Field of the Invention

The present invention relates to an aircraft antenna, and also to an aircraft including such an antenna.

The invention thus lies in the technical field of antennas, and more particularly in the technical field of aircraft.

(2) Description of Related Art

It is common practice to arrange antennas on an aircraft in order to communicate with the outside. Nevertheless, such antennas project from the fuselage. The support surface for antennas is therefore subjected to corrosion and such antennas can make the aircraft unattractive.

It will also be understood that an antenna presents weight that is penalizing and a cost that is not negligible.

Finally, it can be understood that it is sometimes difficult to place an antenna at a location that maximizes its effectiveness, with this applying more particularly to an aircraft of the helicopter type.

Furthermore, among the equipment that an aircraft may include, cable-cutter devices are known that seek to cut a cable should it come into collision with the aircraft.

Document FR 2 443 309 describes a cable-cutter device having a pair of sharp edges arranged on a frame.

Those two sharp edges are arranged in such a manner as to form between them an angle, thereby producing a sloping plane or wedge effect, while also presenting a cutting face to a cable that comes into contact with the sharp edges.

The frame then has a jaw carrying the sharp edges, the jaw being extended by a bottom deflector fastened to the cockpit of an aircraft and by a top deflector.

On certain aircraft, an antenna is mounted close to the cable-cutter device, or indeed on the base of such a cable-cutter device, which base is fastened to the fuselage.

Proposals have also been made to fasten an antenna on the cable-cutter device.

Document WO 99/38770 thus proposes arranging a slot antenna on a cable-cutter device.

A conductive plate then has a slot filled with a dielectric material that is selected to optimize the impedance of the slot.

The state of the art also mentions impedance matchers, sometimes referred to as "tuners", that serve to match the impedance of an antenna as a function of its requirements. Reference may be made to the information present on the Internet at the following address: http://en.wikipedia.org/wiki/Antenna_tuner.

The following documents are also known: WO 95/07214; EP 2 165 930; and WO 2006/068507.

BRIEF SUMMARY OF THE INVENTION

An object of the present invention is thus to propose an antenna suitable for facilitating incorporation in an aircraft and for presenting limited impact in terms of weight and cost.

According to the invention, an aircraft antenna is fitted with a coaxial cable provided with a coaxial connector comprising a core and shielding, the coaxial cable being suitable for being connected to a source for co-operating with the antenna.

The term "source" is used to designate an electronic, electrical, or wired system for causing the antenna to operate to transmit an electromagnetic wave or to receive such a wave.

The antenna is remarkable in particular in that said antenna comprises a cable-cutter device having a frame carrying two sharp edges, the antenna including an impedance-matching system connecting the frame to said core, said frame being a radiating member of the antenna in receiving and/or transmitting mode.

The invention thus does not require an antenna to be incorporated in a cable-cutter device, but rather causes metal equipment that is projecting from the fuselage to act as an antenna even though it was not designed for that purpose, i.e. a conventional cable-cutter device.

It is then possible to obtain an antenna from a cable-cutter device by adding a coaxial connector that co-operates with a coaxial cable and an impedance-matching system, the frame of the cable-cutter device performing the antenna function while also carrying the sharp edges suitable for cutting a cable. The frame as such then serves to transmit or receive electromagnetic waves, in contrast in particular to antennas that make use of wires for this purpose.

Under such circumstances, instead of installing an antenna on the fuselage of an aircraft, it is possible to use the cable-cutter device as an antenna, at the minor cost of organizing a coaxial cable provided with a coaxial connector and an impedance-matching system, which has no impact on the cable-cutting function.

It can be understood that a device is obtained that is advantageous in terms of weight, of purchase cost, and of maintenance cost, the invention also being applicable to already-existing cable-cutter devices.

Furthermore, since cable-cutter devices are often arranged at locations that encourage the transmission or the reception of waves, an antenna is obtained that is placed in a preferred location of the aircraft.

It should also be observed that cable-cutter devices are generally robust in order to withstand impacting against a cable. This means that an antenna is obtained that is likewise robust with minimized risk of ceasing to operate as a result of an accident. The antenna obtained using a cable-cutter device can then be even more advantageous by also performing an antenna function for an emergency beacon, for example.

The impedance-matching system may comprise electronic components. Such electronic components are selected and dimensioned so that the impedance of the antenna as seen from the coaxial connector is purely resistive and not capacitive or inductive. Under such circumstances, a frame is obtained that is resonant at a frequency under consideration, and consequently that is an antenna.

Reference may be made to the literature to obtain descriptions of impedance-matching systems that enable the cable-cutter device to operate as an antenna at the desired frequency.

The antenna may also include one or more of the following additional characteristics.

By way of example, the antenna may comprise a mounting panel in electrical contact with the frame, the shielding being in electrical contact with said mounting panel.

Such a mounting panel is also referred to as a "ground plane" by the person skilled in the art.

Advantageously, the mounting panel is a structural element of the fuselage of the aircraft, thereby encouraging good connection with aircraft ground. Such a structural element may form part of a cover.

It is difficult to isolate the cable-cutter device electrically from the fuselage of the aircraft. Under such circumstances, it is advantageous for the antenna made using the cable-cutter device to be an antenna in which the radiating member is a frame of the cable-cutter device that is in contact with a ground plane. An antenna of the quarterwave type is suitable, for example.

In order to enhance electrical contact, in one embodiment, the zones of the frame and of the mounting panel that are to come into contact with one another may be sanded with care.

In an alternative embodiment, the antenna may include electrically-conductive paint between the frame and the mounting panel.

Furthermore, when the frame is made up of a plurality of elements that are fastened to one another, the zones of said elements that are to come into contact with one another may be sanded with care.

In another variant, the antenna may include electrically-conductive paint between two distinct elements.

For example, the frame may comprise a jaw fastened firstly to a bottom deflector secured to the mounting panel and secondly to a top deflector. It is then possible to provide electrically conductive paint between each deflector and the jaw.

In another aspect, the impedance-matching system may comprise a first wired connection connecting the core to the frame, the first wired connection including a first capacitor.

The impedance-matching system may also include a second wired connection having a second capacitor, said second wired connection being fastened firstly to a mounting panel co-operating with said shielding, and secondly to said first wired connection between the first capacitor and the core.

Under such circumstances, if the cable-cutter device is purely inductive at the frequency under consideration, it is possible to tune the device to said frequency by using said capacitors.

In another aspect, the antenna may be a passive antenna or it may include active means controlled by a control member to enable the antenna to be tuned to a plurality of frequencies.

The cable-cutter device may then operate as an antenna at a plurality of different frequencies.

The active means may include at least one electronic component arranged on the frame or indeed within the impedance-matching system.

Furthermore, said frame optionally includes metal additions for optimizing the radiation of the antenna.

The term "metal additions" is used to designate metal parts that do not contribute to the cable-cutting function and that are arranged on the frame, e.g. at a free end of a top deflector of the frame or on the flanks of the top deflector so as to make it wider.

In addition to an antenna, the invention provides an aircraft having a fuselage.

The aircraft then includes an antenna of the invention, the antenna being fitted with a coaxial cable provided with a coaxial connector comprising a core and shielding, and a cable-cutter device having a frame carrying two sharp edges, the antenna including an impedance-matching system connecting the frame to said core.

Optionally, the shielding and the frame are in electrical contact with the fuselage, the fuselage constituting a mounting panel for the antenna.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements that are shown in more than one of the figures are given the same references in each of them.

DETAILED DESCRIPTION OF THE INVENTION

Figure 1:
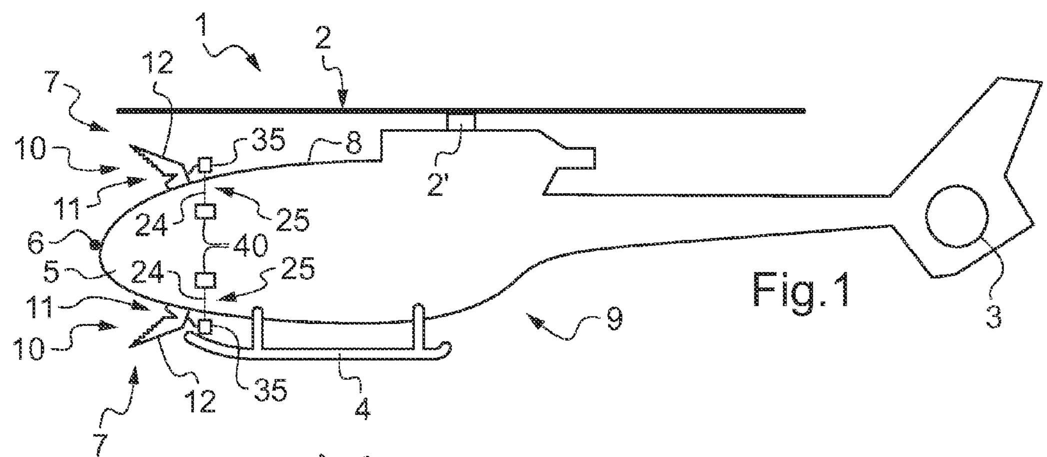
FIG. 1 is a view of an aircraft of the invention.

FIG. 1 shows an aircraft, and more precisely a helicopter 1, having a fuselage 9 carrying a main rotor 2 for providing lift and propulsion, and a tail rotor 3. The main rotor 2 is driven by a power plant via a rotor mast 2'. The helicopter 1 also includes a landing gear 4.

In order to communicate with the outside, the aircraft has at least one antenna, and in particular two antennas 7 of the invention.

Each antenna 7 comprises a coaxial cable 24 fitted with a coaxial connector 25 connected to a source 40 suitable for receiving and/or transmitting a wave, such as an electronic, electrical, or wired source.

More particularly, the antenna 7 comprises equipment projecting from the aircraft and performing a function other than the function of transmitting or receiving an electromagnetic wave.

Specifically, each antenna 7 of the invention comprises a cable-cutter device 10 having the main function of preventing the rotor mast 2' or the landing gear 4 striking a suspended cable 6 while in forward flight.

The cable-cutter device 10 comprises a metal frame 12 defining a throat 100. The throat is blind and thus presents an upstream end open to the outside and a downstream end that is closed by an end wall. Furthermore, the cable cutter 10 has first and second sharp edges 11 secured to the frame 12.

Under such circumstances, it can be seen that the term "frame" is used to cover all of the electrically-conductive elements of the cable-cutter device 10 other than the sharp edges 11.

These first and second sharp edges project into the throat so as to be in a position to cut a cable 6 that penetrates into the throat of the device.

In order to optimize the first and second sharp edges, the person skilled in the art may refer to the existing literature, and in particular to the prior art as described above.

Furthermore, each antenna 7 includes an impedance-matching system 35 connecting the frame 12 to the coaxial connector 25, the frame representing the radiating member of the antenna.

Figure 2:
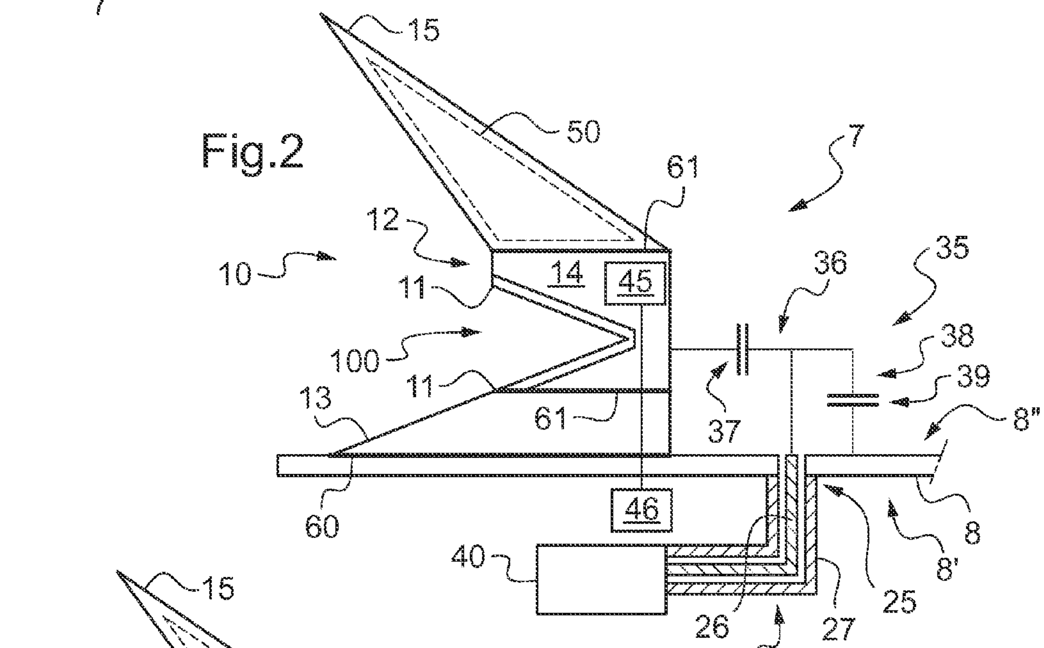
FIG. 2 is a detail view showing an antenna in a first embodiment of the invention.
Figure 3:
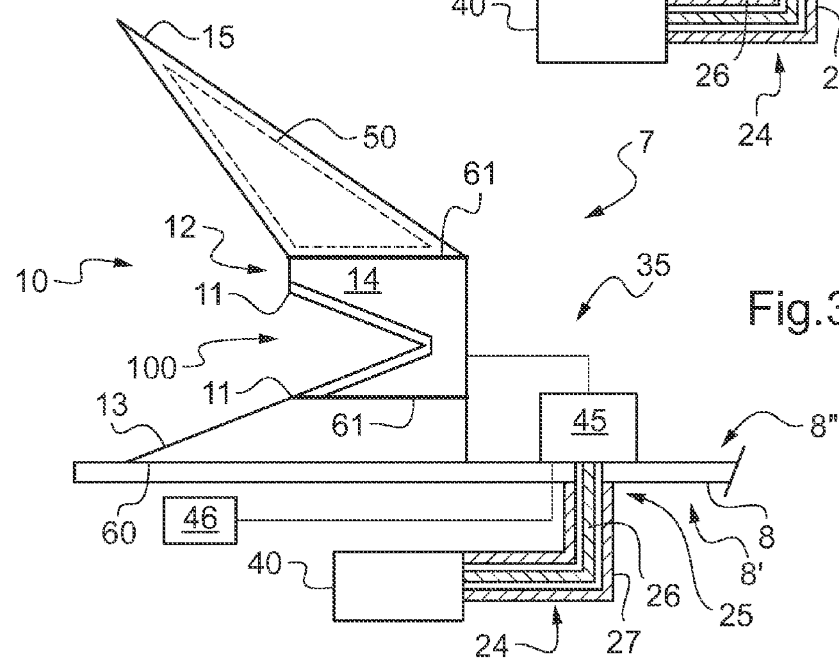
FIG. 3 is a detail view showing an antenna in a second embodiment of the invention.

FIG. 2 shows a first embodiment of the antenna 7 in detail.

In this embodiment, the antenna 7 comprises a coaxial cable 25 having a core 26 and shielding 27, the coaxial cable being connected to a source 40.

Under such circumstances, the impedance-matching system 35 serves in particular to connect the core 26 of the coaxial connector 25 to the frame 12 of the cable-cutter device 10.

The antenna 7 may also include a mounting panel, the mounting panel comprising a structural element 8 of the fuselage 9 of the aircraft, e.g. a wall or a cover.

The shielding 27 of the coaxial connector is optionally fastened to a bottom face 8' of the mounting panel 8, with the frame 12 of the cable-cutter device being fastened to a top face 8" of the mounting panel.

It is then possible to maximize electrical contact between the frame and the mounting panel 8, by sanding the frame 12 or indeed by applying electrically-conductive paint 60 between the frame 12 and the mounting panel 8.

Similarly, the frame may comprise a plurality of electrically-conductive elements, such as a bottom deflector 13 secured to the mounting panel 8, a jaw 14 carrying the sharp edges 11 and defining the throat 100, and a top deflector 15.

It is then possible to maximize electrical contact between the various elements by sanding those elements or indeed by applying electrically-conductive paint 61 between adjacent pairs of elements.

Furthermore, in the first embodiment described, the impedance-matching system 35 may include a first wired connection 36 connecting the core 26 to the frame 12, the first wired connection 36 including a first capacitor 37.

The impedance-matching system 35 also includes a second wired connection 38 including a second capacitor 39.

The second wired connection 38 is then fastened to the mounting panel 8 and to the first wired connection 36 between the first capacitor 37 and the core 26.

In another aspect, it is possible to obtain an active antenna by fitting the antenna 7 with active means 45 controlled by a control member 46, possibly operable by an operator.

In the second embodiment, the active means may also form a part of the impedance-matching system 35. By way of example, the active means may comprise a plurality of capacitors, the control member activating the appropriate capacitors for the antenna to operate at the required frequency.

It can be understood that it is possible to use other types of electronic component without going beyond the ambit of the invention. Reference may be made to the literature in order to obtain descriptions of active means.

Finally, the frame may include metal additions 50 seeking to optimize radiation from the antenna 7, e.g. by thickening the top deflector 15.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An antenna for an aircraft, the antenna being fitted with a coaxial cable provided with a coaxial connector comprising a core and shielding, the coaxial cable being suitable for being connected to a source for co-operating with the antenna, wherein the antenna comprises a cable-cutter device having a frame carrying two sharp edges, said antenna including an impedance-matching system connecting said frame to said core, said frame being a radiating member of the antenna.

2. An antenna according to claim 1, comprising a mounting panel in electrical contact with said frame, said shielding being in electrical contact with said mounting panel.

3. An antenna according to claim 2, wherein said mounting panel is a structural element of the fuselage of the aircraft.

4. An antenna according to claim 2, including electrically-conductive paint between said frame and said mounting panel.

5. An antenna according to claim 1, wherein said frame comprises a plurality of elements that are fastened to one another, and said antenna includes electrically-conductive paint between two distinct elements.

6. An antenna according to claim 1, wherein said impedance-matching system comprises a first wired connection including a first capacitor and connecting said core to said frame, said impedance-matching system including a second wired connection having a second capacitor, said second wired connection being fastened firstly to the mounting panel that co-operates with said shielding, and secondly to said first wired connection between the first capacitor and the core.

7. An antenna according to claim 1, including active means controlled by a control member to enable the antenna to be tuned to a plurality of frequencies.

8. An antenna according to claim 1, wherein said frame includes metal additions for optimizing the radiation of the antenna.

9. An aircraft having a fuselage, wherein the aircraft includes an antenna according to claim 1, said antenna being fitted with a coaxial cable provided with a coaxial connector comprising a core and shielding, and a cable-cutter device having a frame carrying two sharp edges, the antenna including an impedance-matching system connecting said frame to said core.

10. An aircraft according to claim 9, wherein said shielding and said frame are in electrical contact with said fuselage, said fuselage constituting a mounting panel for said antenna.

* * * * *